United States Patent [19]

Povlick et al.

[11] Patent Number: 4,590,356

[45] Date of Patent: May 20, 1986

[54] ROBOT NAVIGATION METHOD FOR JOINT FOLLOWING

[75] Inventors: Thomas P. Povlick, Clifton Park; Allen W. Case, Jr., Amsterdam, both of N.Y.

[73] Assignee: General Electric Company, Schenectady, N.Y.

[21] Appl. No.: 754,558

[22] Filed: Jul. 12, 1985

[51] Int. Cl.⁴ ................................................. B23K 9/12
[52] U.S. Cl. .............................. 219/124.34; 318/577; 901/9; 901/42; 901/47
[58] Field of Search ................... 219/124.34; 318/577; 901/9, 42, 47

[56] References Cited

U.S. PATENT DOCUMENTS 4,413,180 11/1983 Libby ................................. 250/236
4,491,719 1/1985 Corby, Jr. ...................... 219/124.34
4,501,950 2/1985 Richardson .................... 219/124.34
4,542,279 9/1985 Case, Jr. et al. ............... 219/124.34

*Primary Examiner*—Clifford C. Shaw
*Attorney, Agent, or Firm*—Donald R. Campbell; James C. Davis, Jr.; Paul R. Webb, II

[57] ABSTRACT

The positioning system of an industrial robot having a vision sensor and structured light pattern projector, such as a welding robot, is centered and vectored along a joint to be tracked. Navigation information derived from the scene is used to compute move microvectors; the next move vector is extracted and computed while the current move vector is executed. To track 90° corners and small radius turns, the parallelism between two lines formed by the intersection of concentric circular arc light stripes and the joint edges is determined. When the parallelism is out of limits the previously calculated microvector is used until parallelism is re-established.

6 Claims, 11 Drawing Figures

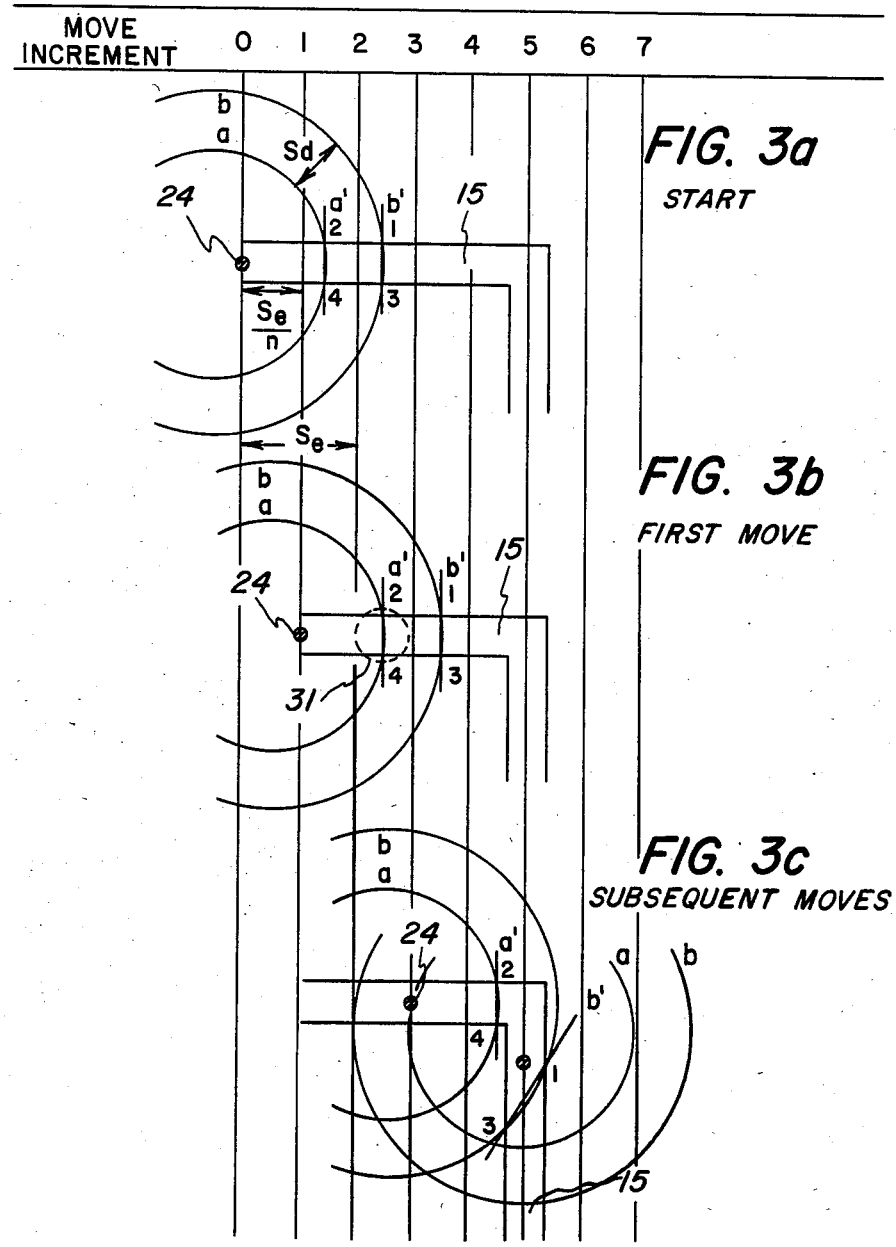

ROBOT NAVIGATION METHOD FOR JOINT FOLLOWING

BACKGROUND OF THE INVENTION

This invention relates to an improved method of controlling the positioning system of a robot, especially a welding robot with a vision sensor, to track a joint.

Conventional automatic arc welding systems are preprogrammed to move the welding torch along a prescribed path in close proximity to the joint. Reliance on preprogrammed torch motion often results in unsatisfactory welds in many manufacturing applications. There are variations in the dimensions of the metal parts, and heating during welding may produce thermal distortion and warping, causing the joint to move from its original position. A sensor-based tracking system is necessary to have the robot positioning system center the torch's electrode over the joint.

Visually guided tungsten inert gas (TIG) and metal inert gas (MIG) welding systems are described in several commonly assigned patents and copending applications. The center of the arc welding torch is cleared and lenses in the upper part of the torch assembly look down over the welding electrode, focusing an image of the weld puddle and joint ahead of it on the end of a fiber optic cable. The image is relayed to a solid state television-type camera that is in turn linked to a microprocessor-based intelligent vision system that analyzes the scene presented to it. Seam tracking is done by projecting a structured light pattern, such as two parallel laser bars, onto the workpieces ahead of the electrode. The location of deviations in the light bars caused by the joint indicate its position and width, providing the vision system with the information needed to control movement of the robot to automatically follow the seam.

A navigation algorithm for centering and vectoring the positioning system along a joint formed by two parts is given in allowed copending application Ser. No. 472,796, filed Mar. 7, 1983, now U.S. Pat. No. 4,542,279 A. W. Case, Jr., C. G. Ringwall, and M. L. Pollick, "Microvector Control for Edge and Joint Following", now U.S. Pat. No. 4,542,279, the disclosure of which is incorporated herein by reference. The method involves extracting and computing the next move vector from the vision scene while the current move vector is being executed. The next vector becomes the new target for the robot's positioning system and is computed and ready for execution before execution of the current vector is complete. If the structured light pattern is two parallel bars nominally perpendicular to the seam, however, the robot successfully navigates along straight joints and those with large radius bends, but is unable to follow 90° corners and small radius turns (less than 0.3 inches radius, for instance).

SUMMARY OF THE INVENTION

An object of the invention is to provide improved automatic seam tracking equipment, whether for welding or another application, and a more versatile method of navigating a robot along a joint between workpieces.

Another object is to extend and improve upon the microvector control technique for joint following already explained to track right angles and small radius curves.

To realize these improvements, the light pattern projected onto the joint is two concentric circular or approximately circular arcs that curve backward relative to the direction of travel along the joint. Sets of navigation points, the two intersections of each light stripe with the joint edges, are extracted from the image and give the location and width of the joint. Move vectors are computed from this navigation data and from positioning system feedback; a future move vector is extracted and computed while a current move vector is executed.

A modification of the prior navigation method is that as the initial part of the move vector calculation, the parallelism between two straight lines through the respective sets of navigation points, at the intersections of the circular arc light stripes and joint edges, is determined. If the two lines are parallel within a prespecified tolerance band or within allowable plus and minus limits, the microvector calculation proceeds normally. When the parallelism is outside this band, the previously computed move vector value is used until parallelism is re-established and the currently computed move vectors are executed. When parallelism is re-established, the angle change of the rotatable axis, to follow the joint, is immediately updated to the current angle computed by the microvector algorithm.

BRIEF DESCRIPTION OF THE DRAWINGS

FIGS. 3a–3c are diagrams to explain microvectoring the positioning system along straight, large radius, and 90° and small radius joints.

FIG. 5 is an enlargement of the region in FIG. 3a around the intersection of the joint and light stripe a.

DETAILED DESCRIPTION OF THE INVENTION

Figure 1:
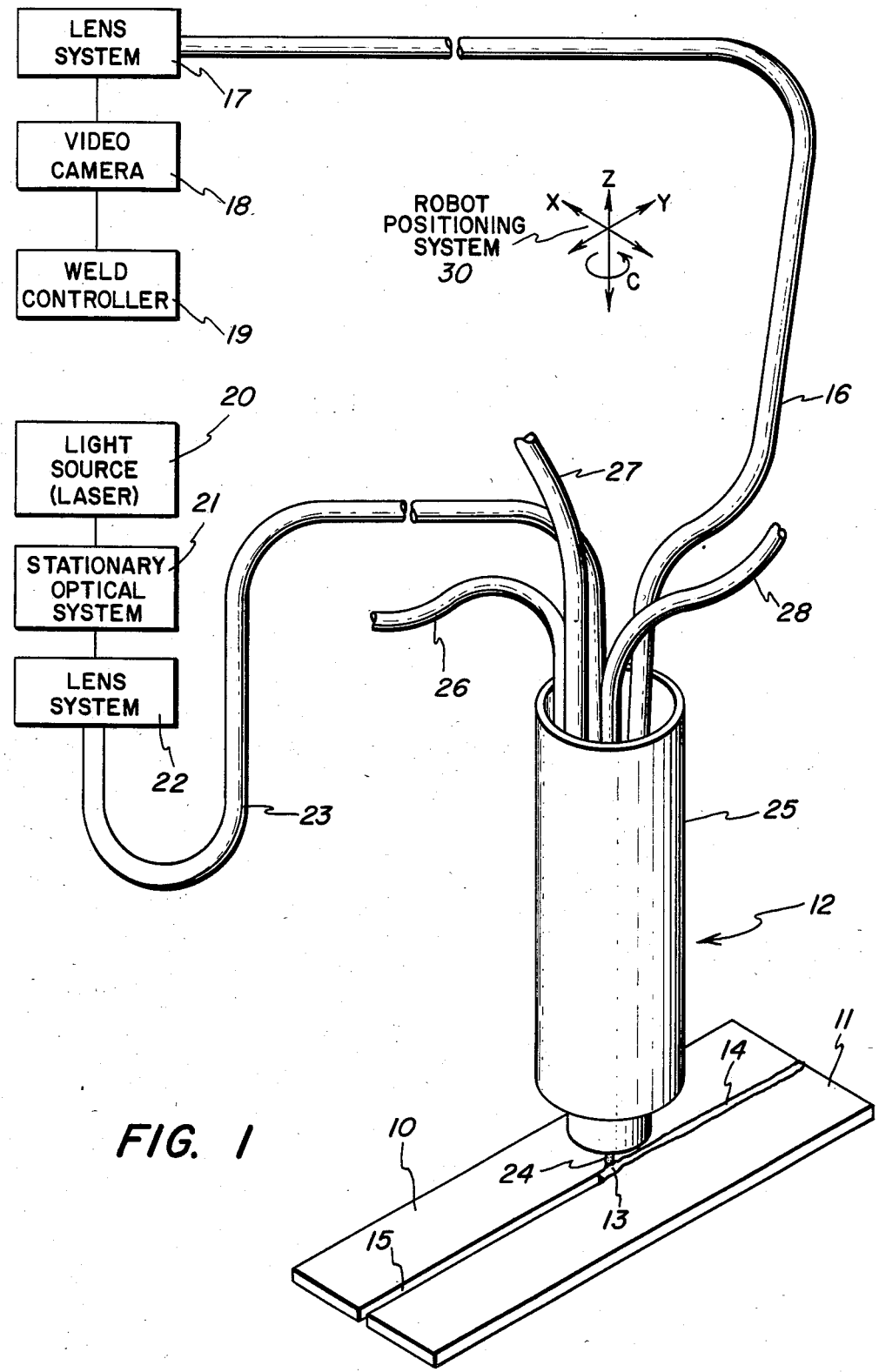
FIG. 1 is a system diagram for a seam tracking robotic arc welding system which has an integral vision sensor.

Seam welding of workpieces 10 and 11 is illustrated in FIG. 1 using a gas tungsten arc welding (GTAW) torch 12 that has integral light pattern projection and puddle view optical systems. The weld puddle 13, part of the remelt zone 14 and the joint 15 between the workpieces immediately ahead of the weld puddle, and the structured light pattern (not shown), two concentric arc-shaped or circular light stripes, are imaged on the face of a coherent fiber optic bundle 16 by which the image is transferred to a remotely located television-type camera and welding controller. The image is magnified by a lens system 17 and relayed to a solid state camera 18 such as General Electric's TN2500 Charge Injection Device camera. The video image is fed to a computerized controller 19 and used to navigate the torch to approximately follow the centerline of joint 15 and to consistently achieve good quality welds.

The laser pattern projection system generates a quiescent, steady in time, arc shaped or circular light pattern. A light source 20, generally a laser, forms a narrow beam that is sent to a stationary optical system 21, and the light pattern generated by the optics is imaged by an input lens system 22, at a suitable demagnification, onto the entrance of a coherent fiber optic bundle 23. Alternatively, the programmable projector of U.S. Pat. No. 4,491,719 may be employed to trace light patterns on the fiber end. After passing along the cable the patterned light exits the fiber bundle and is reimaged by an output lens system onto the target surface. To gain navigational information to track straight joints, and joints with large and small radius turns and 90° corners, two concentric circular arcs or circles whose center is preferably at the welding electrode 24, are desired. Welding torch 12 has an insulating jacket 25, and the cover gas, cooling water, and electrical power supply lines 26–28 plus fiber optic bundles 16 and 23 are made to exit away from the weld area.

The following U.S. patents and copending applications give more information on the optical torch and robotic welding system: U.S. Pat. No. 4,488,032; Ser. No. 554,512, filed Nov. 23, 1983, now U.S. Pat. No. 4,532,405 N. R. Corby, Jr., R. M. Lund, D. C. Peroutky, "Arc Welding Torch With Two Integral Optical Systems"; and Ser. No. 723,591, filed Apr. 15, 1985, C. M. Penney, "Quiescent Circle and Arc Generator".

Figure 2:
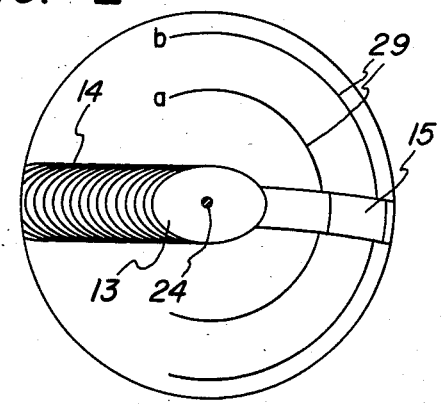
FIG. 2 shows the scene imaged by the puddle view optical system on the welding torch and two circular arc laser stripes projected onto the joint to provide navigational information.

FIG. 2 shows the field of view of the integral puddle view optical system in welding torch 12. The position of tungsten electrode 24 is illustrated at or near the center of the weld puddle 13 and nominally close to the center of the weld region that is imaged and picked up by the solid state CID camera 18. The structured illumination, two thin, concentric, widely spaced, circular arc light stripes or bars 29 slightly longer than 180° in length, hereafter referred to as light stripes a and b, are focused onto the workpiece and joint 15 close to and just ahead of the weld puddle. Knowledge of the plate typography close to the molten weld pool is gained leading to more accurate navigational information because changes in the joint profile caused by heat, etc., are accounted for. There are discontinuities in the light stripes at the joint; this displacement of the light stripes is caused by the parallax effect. The CID imager 18 has a 256 by 256 matrix of pixels which are read out line by line. The breaks in the light stripes at the intersections with the joint edges may be sensed and thus the location of the joint. It is observed that the central parts of light stripes a and b, to the extent possible, are approximately perpendicular to the joint centerline.

The positioning system 30 of the welding robot is depicted schematically in FIG. 1 and has three linear axes (X, Y, Z) and one rotary axis (C). This robotic machine is described in U.S. Pat. No. 4,466,770, the disclosure of which is incorporated herein by reference. The C-axis is rotatable about the Z-axis, and the welding torch 12 is mounted by means of a bracket on the lower end of the Z-axis. Position feedback is by incremental optical encoders; on the X and Y axes the encoders are located at the opposite ends of the lead screws from the servomotors, and on the Z and C axes the encoders are rigidly coupled to the servomotors.

Figure 6:
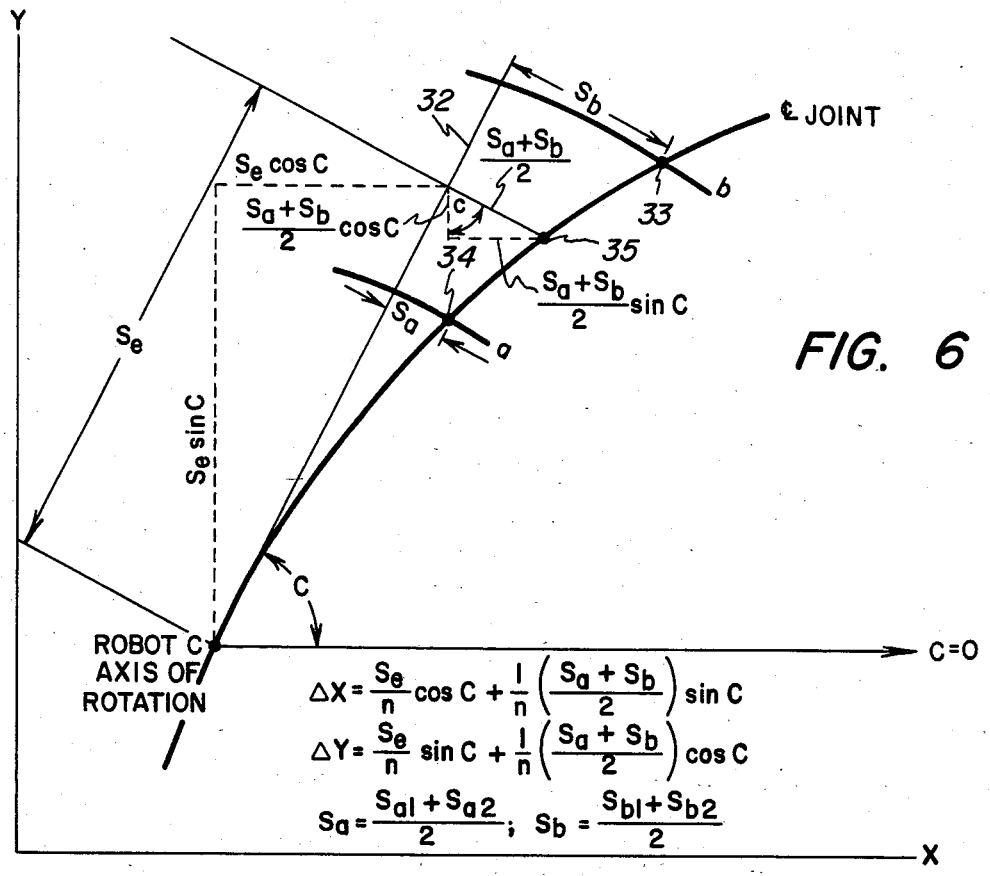
FIG. 6 concerns derivation of navigation algorithms for X and Y movements of the positioning system and shows the joint centerline and circular arc light stripes.
Figure 7:
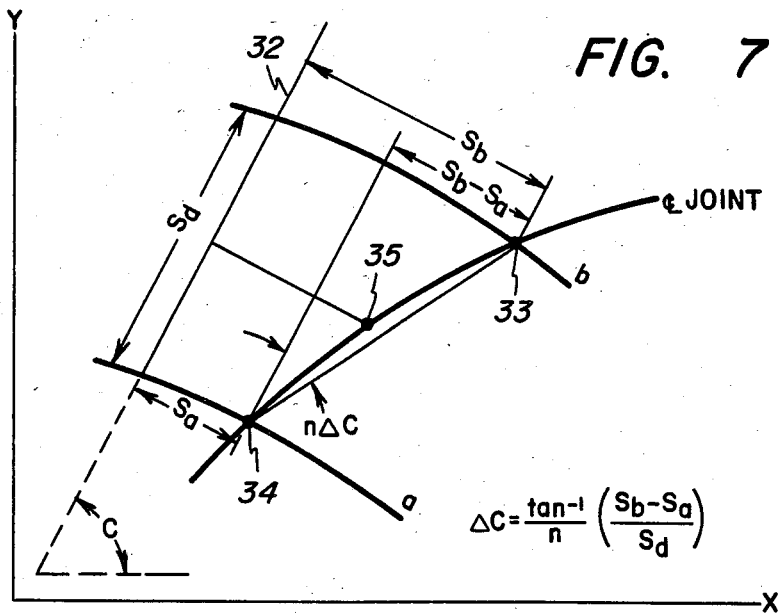
FIG. 7 concerns derivation of the algorithm for rotational (C-axis) movement and is an enlargement of part of FIG. 6.

The navigation algorithm developed by Case, Ringwall and Pollick for centering and vectoring the robot positioning system 30 along the joint 15 between two parts 10 and 11 to be seam welded, is shown in FIGS. 6 and 7. This algorithm uses the information derived from the visual scene (FIG. 2) to drive the positioning system forward. The algorithm is based on extracting and computing the next move vector from the vision scene while the current move vector is being executed. The next vector becomes the new target for the positioning system and must be computed and ready for execution by the control before execution of the current vector is complete. This microvector control strategy derives from the scene distance and direction commands to move the robot forward. The following analysis and microvector calculations assume that the welding torch 12 is orthogonal to the workpiece surface and that the welding electrode 24 is on the rotational axis of the positioning system (the C-axis).

Referring to FIGS. 3a–3c which illustrate microvectoring, the length of the move vector is an integer fraction, 1/n, of the displacement, $S_e$, between the welding electrode 24 and the midpoint between the pair of structured light stripes a and b; in these figures, n=2. The vector direction is computed from the current position of the robot rotation axis (C-axis). The steps in the move algorithm are as follows.

1. Assume electrode 24 has been manually positioned over the joint at 0 and light stripes a and b oriented so they are perpendicular to the joint.

2. The first move is a default vector. Read the robot C-axis angle and compute the microvector to go to move increment 1. The angle is read directly from the C-axis optical encoder on the positioning system. To determine ΔX and ΔY (see FIG. 6), the known unit move length is multiplied by sin C and cos C. The move vector is now expressed in the coordinate space of the robot.

3. At time =0, start the first move microvector and capture the scene. The image read out of video camera 18 is transferred to the controller 19 for analysis.

4. While going from move increment 0 to 1, compute the mircrovector for the second move to 2. This computation must be completed and loaded into the robot controller before the positioning system completes the first move, before electrode 24 reaches 1. The calculations of ΔX, ΔY and ΔC, using the navigational algorithms in FIGS. 6 and 7, are done in a fraction of a second. A departure from the prior method is that as the initial part of the microvector calculation, the parallelism between two lines formed by the intersection of the circular arc stripes and the joint edges is determined. Navigation points 1 and 3 are at the intersections of light stripe b and the edges of joint 15; a straight line through them is denoted line b'. The other two navigation points 2 and 4 are at the intersections of the joint edges and light stripe a and the straight line through them is line a'. If these two lines a' and b' are parallel within a prespecified tolerance, or within allowable plus and minus limits, then the microvector calculation proceeds normally. If the parallelism falls outside this band, the next microvector value used is its previously calculated one.

5. After the first move is complete, a robot servo early ready signal initiates capture of the next scene from which the third move is computed. The image picked up by the CID imager at that instant is read out to the controller for processing.

6. While the robot is executing the second move, from move increment 1 to 2, compute the microvector for the third move to 3, and so on.

7. For 90° turns and small radius turns (less than 0.3 inches radius), the two lines a' and b' defined by the two sets of navigation points are not approximately parallel within the prespecified tolerance. This is seen in FIG. 3c. The robot is at move increment 3; the scene is captured from which the fourth move from 3 to 4 is calculated. Lines a' and b' are no longer parallel and the previously computed microvector values are used. If the tolerance band for parallelism is small, then the condition for a microvector update does not occur until the electrode 24 is centered or approximately centered on the 90° corner. The only other change occurs when parallelism is re-established, the C angle of the robot is immediately updated to the current angle calculated by the microvector algorithm. FIG. 3c shows the light stripes again perpendicular to the joint after the sixth move. The fourth and fifth moves used the microvector values computed for the third move.

8. If the vision system is unable to determine joint location for any scene, the robot controller continues along the current trajectory. This takes care of the tack weld problem.

Figure 4B:
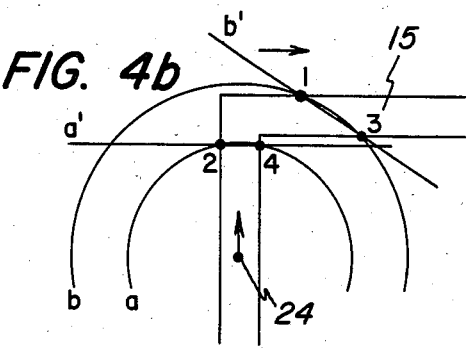
FIGS. 4b–4c show subsequent moves.
Figure 4C:
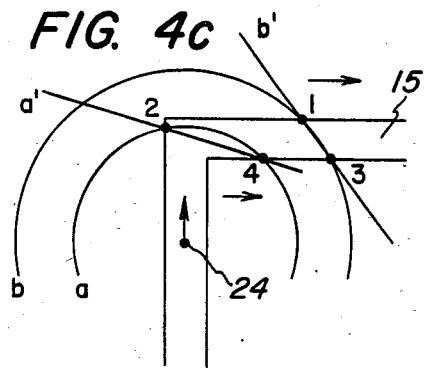
Figure 4D:
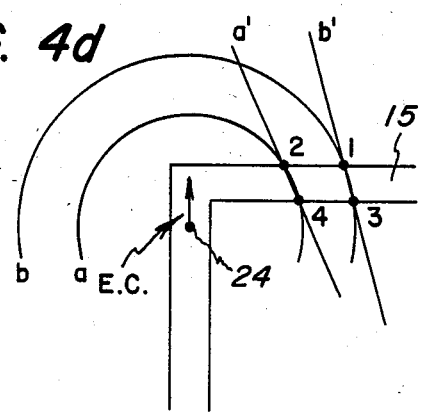
FIG. 4a depicts the image scene from the solid state camera and a move just before navigating around a square corner in the joint.
Figure 4E:
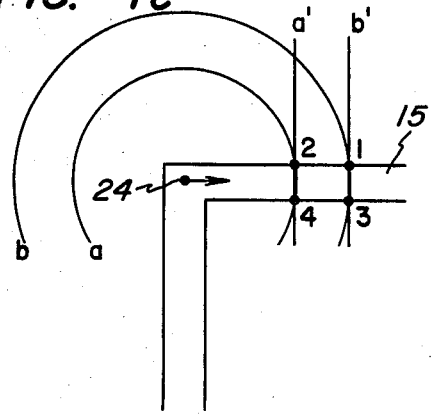
Figure 4A:
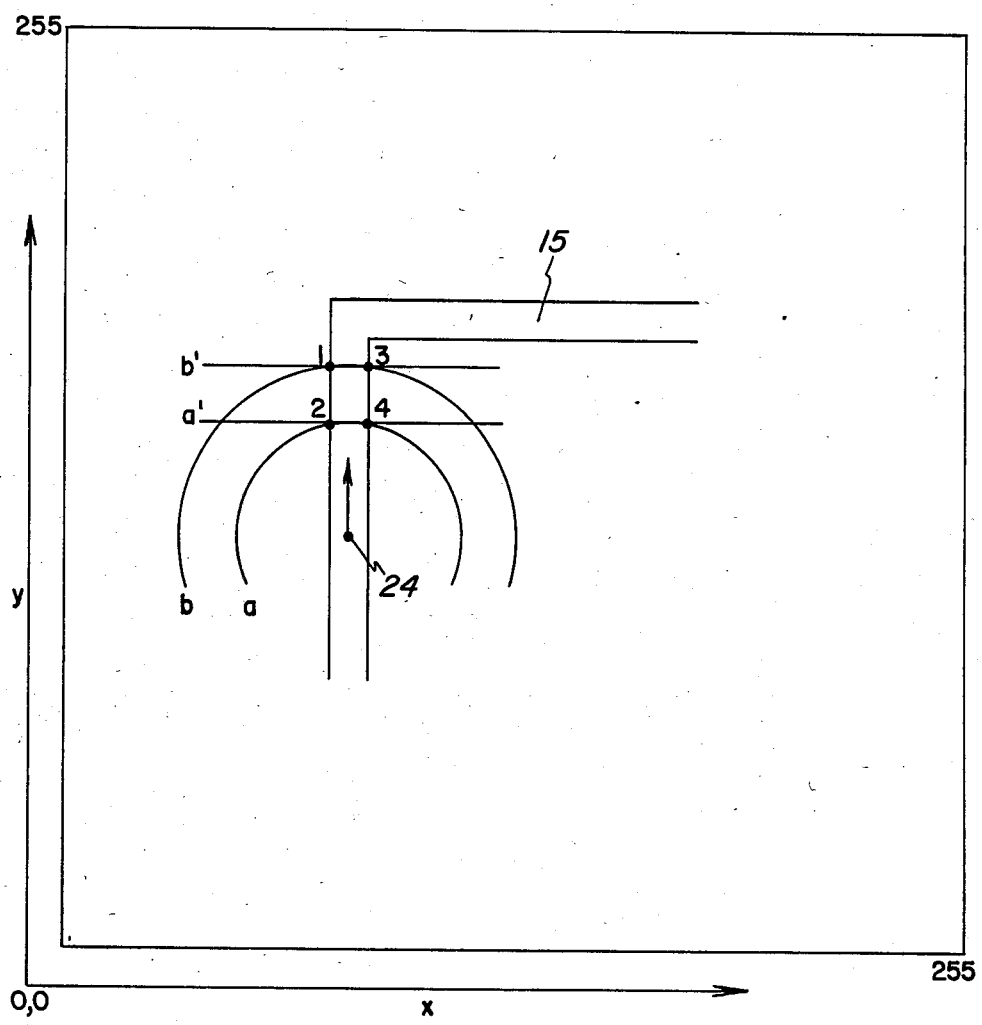

FIGS. 4a–4e illustrate in greater detail the steps in tracking a right angle corner in a joint. The first shows the image sensor of a television-type solid state camera 25 which has a 256 by 256 pixel matrix. Light stripes a and b are concentric circular arcs, slightly greater in length than half circles, whose center is at the welding electrode 24. The intersections of the light stripes with the joint edges, navigation points 1–4, provide information to determine the location and width of the joint. One way of determining the degree of parallelism of lines a' and b' is to compare the slopes of the two straight lines. If the lines are parallel the slopes are the same. To satisfy the requirement of approximate parallelism of this navigation method, the difference between the two slopes, plus or minus, is less than a given number. The equation of a straight line is $y=mx+b$, where m is the slope and b is the intercept. The slopes $m_1$ and $m_2$ of the two lines are determined, and their difference is less than a predetermined amount to be accepted as parallel. In FIGS. 4b–4d it is seen that lines a' and b' are not approximately parallel and the previously calculated microvector values are used. The condition of the required degree of parallelism for a microvector update does not occur until the torch's electrode 24 is centered or nearly centered on the 90° corner as shown in FIG. 4e. At this point the C angle of the robot is immediately updated to the current angle calculated by the microvector algorithm.

Figure 5:
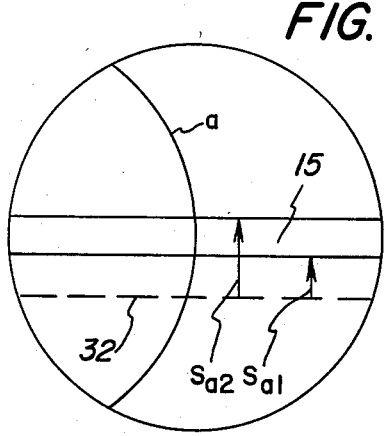

In FIGS. 3a and 3b, the distance between light stripes a and b, $S_d$, is typically 100–150 mils. FIG. 5 is an enlargement of the region inside of dashed circle 31, the intersection of light stripe a with joint 15. Let $S_{a1}$ and $S_{a2}$ be the distance from the two edges of joint 15 to a reference 32, the current position of the robot C-axis. Then, $S_a$, the nominal joint center at bar a is found by adding them and dividing by two. The formulas for $S_a$ and $S_b$, the nominal joint center at bar b, are given in FIG. 6. From the captured image two parameters from each light stripe are extracted, $S_{a1}$ and $S_{a2}$ from the a bar and $S_{b1}$ and $S_{b2}$ from the b bar. In addition, the current C-axis angle of the positioning system is known as well as the X and Y coordinates. Given these parameters extracted from the image and obtained from the positioning system, $\Delta X$, $\Delta Y$ and $\Delta C$ are to be calculated. Derivation of the algorithms for the first two can be seen in FIG. 6, which shows the centerline of joint 15 and light stripes a and b. The X and Y coordinates are those of the robot positioning system. Angle C is the current C-axis angle of the robot and is measured from the X axis. Reference line 32 designates the current position of the robot's C-axis and would be the path followed by the positioning system if the joint were straight rather than curved. Having the location of the four joint edges, the navigation points from the viewed scene, $S_a$ and $S_b$ are calculated and the intersections of light stripes a and b with the joint centerline (points 33 and 34) are determined. By adding $S_a$ and $S_b$ and dividing by two, the approximate location of the point along the joint centerline halfway between the light stripes (point 35) is calculated. This is the target point for n moves of the robot positioning system; a new target point is established after each move. If $n=2$, only half the move is made and if $n=4$, a quarter of the move is made; n is desirably as large as possible but depends on the time required to process the vision sensor information. The result of this microvector control strategy is that the robot only approximately follows the joint centerline. The navigation algorithms for $\Delta X$ and $\Delta Y$ are understood by resolving the location of target point 35 into X and Y components as shown in dashed lines.

The navigation algorithm for $\Delta C$ is given in FIG. 7 which shows a portion of FIG. 6. A triangle is constructed having one side parallel to reference line 32 and a second side connecting points 33 and 34. The included angle is $n\Delta C$ because only 1/n the change in the C-axis is made by the next move. The equation is evident from the geometry in the figure. The C-axis correction to follow the joint is only approximate. There are additional terms to account for welding torch offset from the Z-axis and a variable torch angle (not 90°). This description of the navigation algorithms can be supplemented by the more complete explanation in U.S. Pat. No. 4,542,279.

The navigation method has been explained with regard to a robot control technique in which the sensor data is used as the only information guiding the robot along the path, without reference to a taught path. It is also for controls having sensor-based compensation for taught path robot motion control. The navigation algorithm is anticipated to have wide application in automatic seam tracking equipment.

While the invention has been particularly shown and described with reference to preferred embodiments, it will be understood that various changes in form and details may be made without departing from the spirit and scope of the invention.

What is claimed is:

1. In a method of controlling a robot positioning system to follow a joint between workpieces by projecting a structured light pattern, viewing the scene with a vision sensor and producing images that are transferred to a controller, executing move vectors that cause said positioning system to move by increments to approximately follow said joint and are computed from sets of navigation points extracted from said images indicating the location and width of said joint and from positioning system feedback, a future move vector being extracted and computed while a current move vector is executed; the improvement to track 90° corners and small radius turns wherein said structured light pattern is two concentric arc-shaped stripes and which comprises:
(a) every time said move vector is computed, determining two straight lines between the respective sets of navigation points at the intersections of said arc-shaped stripes and joint edges;

(b) determining whether said lines are parallel within a prespecified tolerance band;

(c) when the parallelism is outside said band, using the previously computed move vector until parallelism is re-established and currently computed move vectors are again executed.

2. The method of claim 1 wherein said move vector specifies an angle change to follow said joint which is immediately updated to the currently computed value upon re-establishing parallelism.

3. The method of claim 2 wherein said arc-shaped stripes are circular arcs slightly greater in length than half circles.

4. A method of controlling the positioning system of an arc welding robot to move by increments and follow a joint between workpieces, said robot having a light projector and optical vision system, comprising the steps of:

(a) projecting two concentric arc-shaped light stripes onto said workpiece and joint ahead of the welding electrode and producing images that are relayed to a video camera and hence to a welding controller;

(b) capturing an image and executing a current move while computing a next move microvector from positioning system feedback data and from sets of navigation points extracted from said images which are at the intersections of each light stripe with the joint edges, each move microvector giving the incremental X and Y movement and angle change to approximately follow said joint, and initially determining whether the parallelism of two straight lines through the respective sets of navigation points is within predetermined limits;

(c) repeating step (b) with the modification that when the parallelism of said lines is outside said limits, the previously calculated move microvector is used until the parallelism is again within limits;

(d) immediately updating the angle change in the move microvector to the currently computed value and resuming step (b).

5. The method of claim 4 wherein said light stripes are circular arcs slightly greater in length than half circles that are centered on said welding electrode.

6. The method of claim 4 wherein the slopes of said two lines are compared to determine parallelism.

* * * * *